Patented Apr. 25, 1933

1,906,074

UNITED STATES PATENT OFFICE

ALBERT THOMAS MERTES, OF NEWPORT, DELAWARE, ASSIGNOR, BY MESNE ASSIGNMENTS, TO KREBS PIGMENT & COLOR CORPORATION, OF WILMINGTON, DELAWARE, A CORPORATION OF DELAWARE

PROCESS OF THE PRODUCTION OF ZINC SALT SOLUTIONS

No Drawing.   Application filed February 18, 1931.  Serial No. 516,839.

Oxidized zinc ores, zinc residues and other impure basic zinc compounds are available in large amounts and are used to produce zinc salt solutions as needed in the technical arts as, for instance, in the electrolytic production of metallic zinc or in the manufacture of zinc sulfid pigments.

The usual processes for producing zinc salt solutions from such zinciferous materials consist in adding said materials to more or less concentrated acid, whereby the zinc and the impurities are dissolved and then treating the crude solution to precipitate the impurities in some insoluble form. Such treatments consist in many instances in the addition of a basic zinc material to the crude, acid solution whereby iron, aluminum and other compounds are precipitated and are then eliminated as by settling and filtration.

Oxidized zinc ores, such as roasted zinc sulfid ores, zinc silicates, zinc carbonates and even roasted zinc ashes contain besides metal impurities, substantial amounts of acid soluble silicic acid compounds, which must be eliminated from the final zinc salt solutions.

The neutralization of the crude, acid zinc salt solutions obtained as above, precipitates, however, the iron, silicic acid and other compounds in the form of bulky, or voluminous precipitates or the silicic acid sets to a gel and the separation of the solution from said precipitates is extremely slow and the recovery of the zinc salt retained in the precipitate is laborious and uneconomical. In many cases the filtration and settling difficulties have been so great as to render unavailable many zinc ores and other zinciferous materials, particularly those containing substantial amounts of acid soluble silicic acid compounds.

Many attempts have been made to overcome these difficulties. Zinciferous materials have been heated with highly concentrated sulfuric acid or acid sulfate, whereby the silicic acid compounds are dehydrated and produced in an insoluble form. Such processes have, however, the disadvantage that they are not only difficult to operate and expensive, but other impurities are rendered soluble by the vigorous action of the acid material and contaminate the final zinc solution obtained. This latter drawback is particularly noticeable in the electrolytic production of metallic zinc where the acid is used in a closed cycle.

Betterton, in a paper published in the Am. Inst. of Mining Eng., Vol. LXIX, page 159, describes an investigation of the jelling of zinc sulfate solutions. He believes it to be due to silicic acid in a transitory stage, whereby jelling occurs after a time, depending on the amount of silicic acid in solution and on the concentration of the zinc sulfate. Jelling occurs in acid as well as in alkaline solution and a more or less hydrated silicic acid is obtained.

The U. S. Bureau of Mines published in its Bulletin 168, 1919, page 135, an investigation by Ralston and Lyon, on the leaching of oxidized zinc ores. It is stated there that silicic acid is the most prominent impurity in such ores. When acid solutions of such ores are neutralized, the silicic acid co-precipitates with the iron, aluminum, etc., giving a solution very difficult to filter, and no satisfactory method was found for purifying such solutions. The following may be cited from this publication. "The writer's experience in leaching raw oxidized zinc ores has been that the difficulty of removing silicic acid makes purification of solutions for satisfactory electrolytic precipitation impossible" and: "many ores now of no value could be used if a process could be devised for overcoming silicic acid trouble."

The present invention has for its object a process of economically recovering zinc salt solutions from zinciferous materials. Another object is to so conduct the leaching operations that undesirable impurities of said material are obtained in an easily filterable form, and still another object is the preparation of zinc solutions in such a manner that silicic acid is prevented from going into solution in substantial amounts, rather than to attempt its removal after being dissolved.

Having these objects in view my invention comprises a careful control and adjustment of the operating conditions of dissolving by acid the zinc content of zinciferous material and it consists in its broadest embodiment in processes wherein the zinciferous material is attacked and the zinc therein dissolved by a dilute acid of a limit concentration.

The zinciferous materials to which my novel process is applicable contain the zinc in the form of silicate, carbonate, or salt of other weak oxygenated acids or as zinc oxide, hydroxide, etc., or even as metallic zinc. Zinc silicate, zinc carbonate ores, roasted zinc sulfid ores, roasted zinc ashes or other roasted zinc containing residues from galvanizing and other zinc consuming industries are typical representatives of the zinciferous materials usable in my process, and I wish it to be understood that for purposes of the present invention the term oxydic zinciferous material is meant to embrace materials of the kind enumerated.

When such oxydic zinciferous material is reacted upon by acid in weak concentration, the zinc compounds and among the heavy metals present the ferrous iron are preferentially attacked, whereas the silicates of iron, aluminum, calcium, etc. are not decomposed to any appreciable extent and remain as insoluble, easy filterable residues. On neutralization, the heavy metal salts dissolved are partially precipitated and eliminated together with the gangue and other insolubles. The small amount of silicic acid that has gone into solution precipitates on neutralization together with hydroxides or basic sulfates of iron, aluminum, etc., and is obtained in a condition in which it is easily filtered out.

I can use any strong acid which produces soluble zinc salts, though the number of such acids which can be used economically is rather limited and for practical purposes hydrochloric and sulfuric acids are the ones preferred. For use in the electrolytic recovery of metallic zinc or in the manufacture of zinc sulfide pigments, zinc sulfate solutions are mostly employed, and as these industries are among the most important outlets of zinc salt solutions produced by my novel process, I shall in the following illustrate my invention in connection with the use of sulfuric acid.

The preferential dissolving of the zinc contained in oxydic zinciferous material is obtained with very weak acid and I have found that this is achieved by attacking the material with an acid, the concentration of which does not exceed the molar concentration corresponding substantially to a 2% by weight sulfuric acid. It is further essential that this limit concentration be obtained throughout the whole of the dissolving step. The acid is used in an amount slightly in excess of that required for a given amount of oxydic zinciferous material; when the dissolving is completed a basic compound, which can be the oxydic zinciferous material itself is added to reduce the free acidity. The hot zinc salt solution continues dissolving zinc oxide with formation of basic zinc salt, even when the pH has reached a value of about 5. Ferric salts are, however, already precipitated as hydroxides at a pH of about 3, at which point the small amounts of silicic acid are co-precipitated with the iron and other heavy metal hydroxides. This silicic acid, together with heavy metal precipitates mixes with the gangue and other insoluble residue and does not interfere with the easy settling and filtration of the same. The zinc salt solution after separation of the insoluble can be further purified, if required, as is well known in the arts of purifying substantially silicic acid free zinc solutions.

The maintaining of a preferentially dissolving acid concentration can be achieved in various ways. One procedure consists in suspending the total amount of oxydic zinciferous material in a body of water in a suitably agitated tank and adding sulfuric acid slowly, either continuously or intermittently, at such a rate that the concentration of free acid in the tank never exceeds 2% sulfuric acid. In another procedure I add both the acid and the zinciferous material simultaneously into the dissolving vat. The concentration of the acid added does not have to be at or below 2% provided there is a sufficient body of liquid present and the agitation produces a rapid dissemination of the acid throughout the reaction mixture.

The attack of the zinciferous material is at the beginning quite rapid as the finer particles are reacted upon at first. When only the larger particles are left the reaction slows down and the rate of addition of the acid has to be carefully watched to prevent exceeding the limit concentration.

It is not necessary to proceed in a two step manner wherein in a first step an acid condition is maintained until all zinc is dissolved and then adding more of the zinciferous material. I can from the start suspend all the zinc material and add to it the reaction liquid in such an amount that the final solution will have a hydrogen ion concentration of from about 3.0 to 5.0.

My invention is furthermore not limited to batch operations. When using a well subdivided material I can add this continuously together with the acid into a dissolving vat, from which a pulp of the solution with the insoluble overflows continuously into one or more additional vats for completion of the reaction and settling.

The temperature of the reaction does not seem to be of vital importance, though somewhat elevated temperatures are preferred and 60° C. may be said to be a lower limit above which a speedy and efficient solution of the zinc takes place. As the reaction is endothermic the reaction mass will heat up and no particular attention need be given to maintain a certain temperature.

The reaction conditions can be adjusted to obtain a concentrated zinc salt solution and no difficulties will be encountered in adjusting the volumes of water used to obtain finally a zinc salt solution of 40-45° Bé. or any other desired concentration.

The following is a description of an operation of recovering zinc sulfate from any oxydic zinciferous material by treatment with a dilute acid according to my invention. The material was a roasted zinc ash containing about 74% combined zinc with substantial amounts of iron, aluminum, etc. compounds, as well as silicious gangue; it was crushed and ground to pass a 40 mesh sieve.

260 parts of this material were suspended in 900 parts cold water in a large vat, equipped with an efficient mechanical stirrer. 296 parts concentrated sulfuric acid were added in successive small portions in such a manner that each portion was substantially insufficient to produce an acid concentration of more than about 2% in the reaction vat, and succeeding portions were only added where previous portions were found, as by testing with Congo red paper, to have been neutralized. The efficient agitation provided a quick distribution of the acid through the reaction mass and prevented local high concentration of the acid. The addition of the acid took about 1½ hours and the temperature rose to over 60° C. An excess of acid corresponding to about 1% of the total used was present at the end of the solution step, and the mixture was then further digested for ½ hour. A calculated amount of zinciferous material was then added to neutralize the acid and produce a condition appearing slightly basic in respect to brom-cresol-green indicator (pH 4.0 to 5.0), at which the heavy metal compound impurities precipitated. The proper amount of zinc material to be added was determined by filtering a portion of the solution and titrating it with acid and brom-cresol-green indicator. If the solution titrates between 0.4 to 1.2 cc. N/10 HCl per 10 cc. of solution, the reaction conditions are satisfactory. Experience has shown that between these limits practically all the ferric compounds have been precipitated and that the precipitate is in a condition which allows of easy filtration. Substantially no silicic acid had been dissolved and reprecipitated under the above conditions.

The practical value of preferentially dissolving the zinc content and avoidance of dissolving the silicic acid compound content in oxydic zinciferous material by the use of dilute acid is best shown in comparing settling rate, volume of precipitate, filtering speed and loss of zinc in the insoluble in operations according to my invention and those commonly in practice today.

The usual procedures of recovering zinc salts from zinciferous materials involve adding the zinciferous material to a more or less concentrated acid which may, for instance, be as low as a 10% sulfuric acid; the zinc, other heavy metals and silicious material go readily in solution and the solution is then neutralized or made slightly alkaline to precipitate silicic acid and other undesirable impurities. The relatively strong acid dissolves also the clay-like matter, as well as the silicates of iron, aluminum, etc., until the acid is reduced to a low concentration, and on neutralizing the solution the silicic acid is precipitated in a highly hydrated, bulky form of more or less gelatinous consistency; it settles out slowly and occupies a large volume. When this bulky precipitate is washed with water the adsorbed or otherwise retained salts, such as zinc sulfate, are replaced by water and a tendency to peptization of the silicic acid gel takes place with further increase of hydration and of the gelatinous nature or sliminess. The washing difficulties are so great that it is practically impossible to remove all the soluble zinc adsorbed in the precipitate and the zinc losses are always high.

Comparing unfiltered solutions obtained in processes as used up to the present and those obtained in processes of my invention, I found that under entirely similar conditions the amount of clear liquor obtained in a given time by settling of zinc sulfate solution obtained in my novel process was from 3 to 5 times that obtained from a zinc sulfate solution obtained from the reaction of a 10% sulfuric acid upon the same zinciferous material.

Similar crude zinc solutions obtained according to my process filtered in from ⅓ to ⅕ of the time required to filter comparable solutions obtained in processes commonly in use.

If samples of the two types of crude liquors are allowed to stand for say 12 hours or more, and the volume occupied by the settled residue or mud noted, this reading will be an indication of the degree of hydration of the insoluble residue, and its filtering properties. There again the volume of the settled residue from zinc solutions produced in previous processes will be found to be several times that of the residue from my novel operations.

Large scale operations have demonstrated that due to this improved nature of the precipitate as obtained in my novel process, the zinc losses in the precipitate could be greatly reduced. It had been found that in operations involving the treatment of a zinciferous material with 10% sulfuric acid the residue obtained was 9.62% of the total zinc material used and it contained 13.8% zinc.

When operating according to my novel process the residue was 7.97% of the original zinc material and its zinc content was only 5.4%.

I claim:

1. The process of dissolving the zinc content of an oxydic zinciferous material containing acid soluble silicic acid compounds which comprises adding sulfuric acid to an aqueous suspension of said material and regulating the addition of the acid to maintain the concentration of the acid during the whole time it is in contact with said material at a concentration which does not exceed 2%.

2. The process of dissolving the zinc content of an oxydic zinciferous material containing acid soluble silicic acid compounds, which comprises suspending said material in an aqueous medium, adding acid to said suspension and controlling the rate of addition of said acid to maintain in said suspension an acid concentration which does not exceed the molar concentration corresponding to 2% sulfuric acid.

3. The process of dissolving the zinc content of an oxydic zinciferous material containing acid soluble silicic acid compounds which comprises adding sulfuric acid to an aqueous suspension of said material and regulating the addition of the acid to maintain the concentration of the acid during the whole time it is in contact with said material at a concentration which does not exceed 2%, adjusting at the end of the reaction the hydrogen ion concentration of the solution to a pH of about 3 to 5 and separating the liquor from the insoluble.

In testimony whereof, I affix my signature.

ALBERT THOMAS MERTES.